April 6, 1965     D. D. SHAUL     3,176,347
APPARATUS FOR PRODUCING THERMOPLASTIC TUBING
Filed Nov. 30, 1962     2 Sheets-Sheet 1

INVENTOR.
D. D. SHAUL

BY Young & Quigg

ATTORNEYS

INVENTOR.
D.D. SHAUL
BY Young E. Quigg
ATTORNEYS

United States Patent Office 3,176,347
Patented Apr. 6, 1965

3,176,347
APPARATUS FOR PRODUCING THERMOPLASTIC TUBING
Duane D. Shaul, Bartlesville, Okla., assignor to Phillips Petroleum Company, a corporation of Delaware
Filed Nov. 30, 1962, Ser. No. 241,350
6 Claims. (Cl. 18—14)

This invention relates to the manufacture of continuous, seamless tubing from thermoplastic materials. In another aspect it relates to a rotating air cooling ring, for use in an apparatus for making continuous, seamless tubing which has a substantially uniform air velocity around the inner orifice of the air ring.

It is well known in the art to form thermoplastic materials into uniform, tubular shapes by extruding the molten, thermoplastic material from a die having an annular opening. The resulting tubular shape is inflated by means of a gaseous medium usually injected through the axial portion of the die. The inflation causes an increase in the diameter of the tubing as it issues from the die and the tubing is cooled as it is inflated. The cooled tubing is usually collapsed between two rollers and wound upon a reel. The inflating medium is thus trapped between the rolls and the die through which the molten, thermoplastic material is extruded. The quantity of the gaseous medium is selected so that the extruded tubing will be inflated to the diameter required to produce the predetermined, desired flat width when the tubing is flattened by the rolls and to produce the desired film thickness. It is necessary for the tubing to be cooled uniformly and quickly so as to obtain a uniform wall thickness of the tubing. Since the inflating pressure on the inside of the tube can be maintained substantially constant, it can be seen that the cooling air on the outside of the tube must also be substantially uniform in quantity, velocity and temperature so that the transition from the molten stage to the set stage of the thermoplastic material will be substantially uniform around the entire periphery of the tubing in order to obtain a tubing of uniform film thickness.

A number of means have been proposed, patented, or used heretofore to cool the exterior peripheral surface of the tubing in the vicinity of the point of extrusion, particularly by using means which provide an annular converging stream of a gaseous cooling medium, such as air. Such prior art means have not been entirely satisfactory, because of the lack of close control over the velocity of the gaseous cooling medium and resort to unwieldy mechanical parts which often fall subject to misalignment and create safety requirement difficulties, particularly where rotating or oscillating parts, such as blowers, motors, air hoses, etc., are required.

I have devised an improved air ring which provides a more uniform flow of air around the entire periphery of the tubing than is provided by the air rings of the prior art.

It is an object of this invention to provide a new and improved air ring for use in an apparatus for producing tubular, thermoplastic film.

It is also an object of this invention to provide a substantially uniform quantity of air to cool a tubular film of thermoplastic material issuing from a die.

Other and further objects will become apparent to one skilled in the art upon studying the following description of the invention and the appended drawing wherein.

Figure 1:
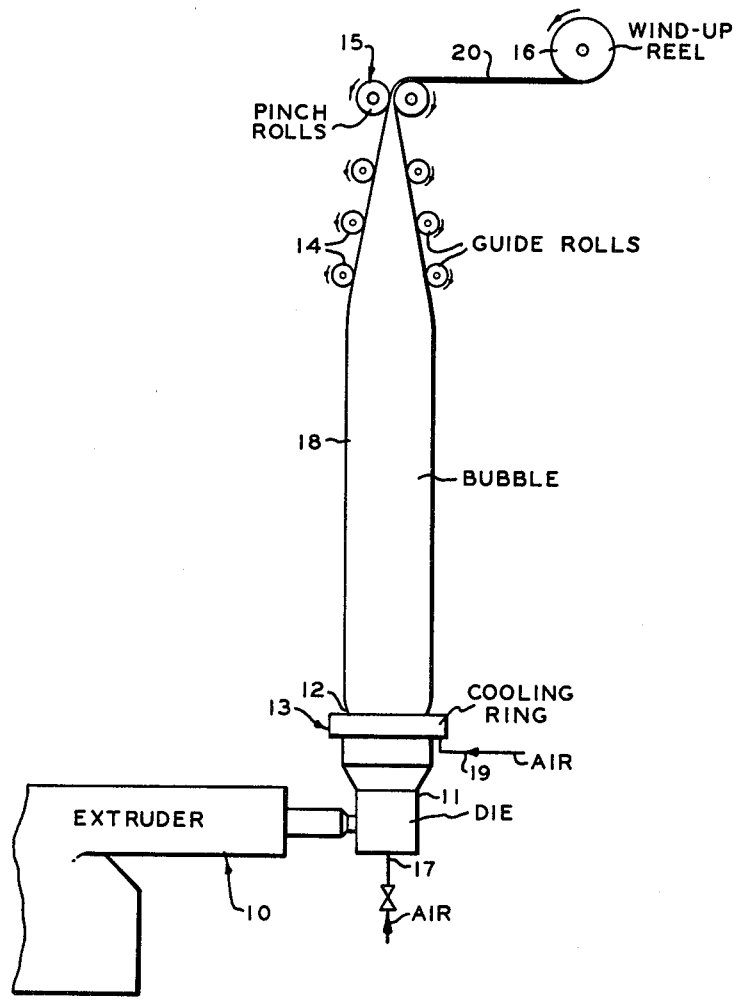
FIGURE 1 is a side elevation of an apparatus embodying the invention.

Referring now to the drawing, wherein like reference numerals designate like parts, and particularly to FIGURE 1, the reference numeral 10 designates an extruder which delivers a thermoplastic material in molten state to the circular die 11. The molten thermoplastic material issues from the circular die as a tubular film 12 and is drawn through the improved cooling ring 13 of this invention, guide rolls 14, pinch rolls 15, and is wound on the reel 16. An inflating gas such as air is admitted through the axial portion of the circular die by means of conduit 17 and inflates the tubular film into a bubble indicated at 18. The rate of travel of the tubular film 12 is such that expansion due to the inflation gas occurs at about the air ring and the tube is cooled and set at a point above the air ring. Cooling air, or other cooling gas, is admitted to the cooling ring 13 through inlet 19. Air is supplied at substantially constant pressure from a source (not shown) such as a blower or a large volume vessel.

Figure 2:
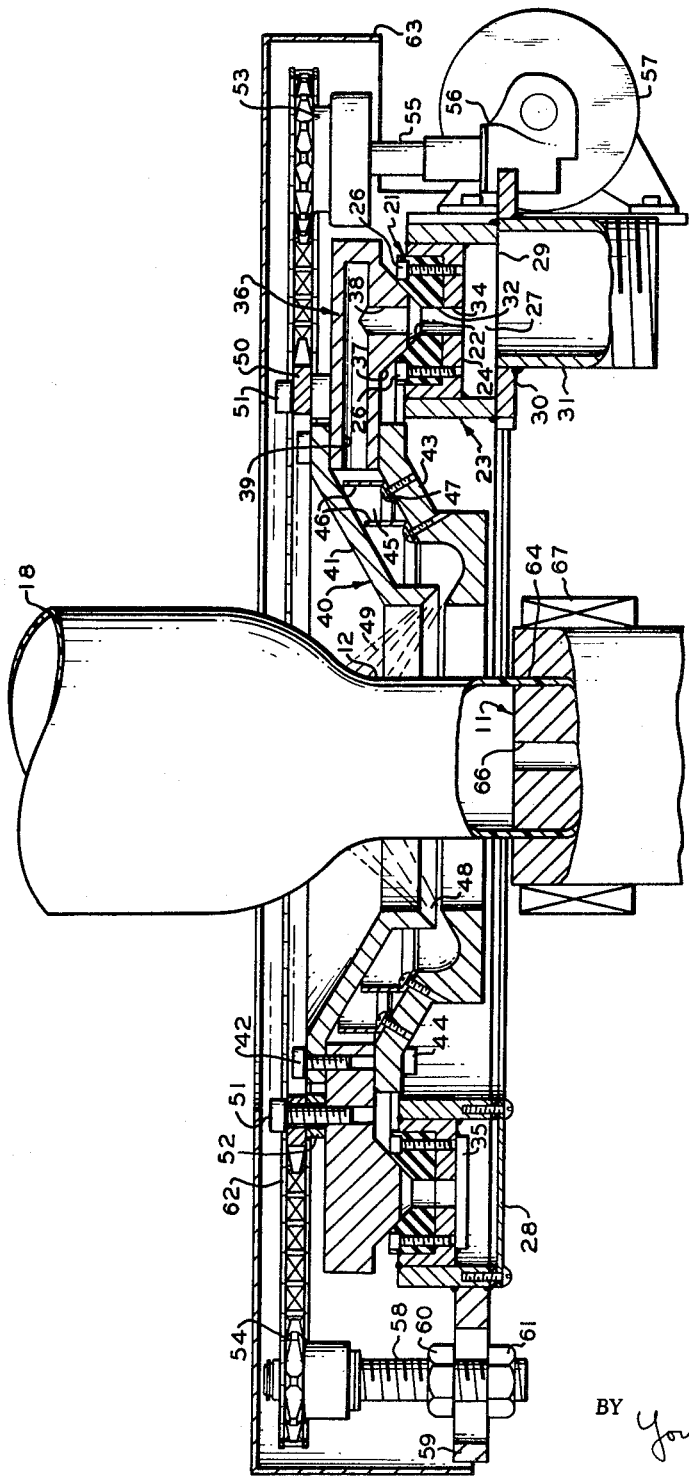
FIGURE 2 is a cross sectional view in elevation of a preferred embodiment of the improved air ring of this invention.

Referring now to FIGURE 2, which shows the preferred embodiment of the air ring of this invention in detail, there is provided a stationary bearing ring 21, preferably of a flat configuration as shown, the upper face of which is provided with a groove 22, preferably in the shape of a V with a flat bottom. This bearing ring 21 is preferably made of a self-lubricating plastic such as Teflon® tetrafluoroethylene resin, Marlex® olefin polymers, nylon, and the like. Bearing ring 21 can be suitably mounted on a stationary bracket or the like, such as the annular bracket generally designated 23 which is shaped like the letter H in cross section, bearing ring 21 being disposed on cross bar 24 and fastened thereto by means of screws 26. The space 27 provided below the cross bar 24 of bracket 23 is closed at its bottom by an annular cover plate 28 except for a plurality of spaced openings 29 (e.g., three such openings) each of which is provided with a bracket 30 having a pipe 31 passing therethrough to supply a gaseous medium, such as air, to space 27, the latter acting as a plenum or manifold. Bearing ring 21 is provided with a plurality of circumferentially spaced openings or ports 32 which can mate with a like number of ports or openings 34 in cross bar 24 of bracket 23. Cross bar 24 is preferably made in the form of two concentric rings spaced apart to provide openings 34 in the form of a segmented annular slot with a plurality of equally spaced radial bars 35, as shown, welded to the undersides of such concentric rings.

Surmounting bearing ring 21 is a rotatable ring 36 which on its lower face is provided with a depending annular rib 37, preferably in the shape of a V, which matches that of groove 22 and rests therein, said rib also preferably being provided with a flat bottom portion which is spaced somewhat above the bottom of groove 22 to leave an annular space or manifold. Rib 37 is provided with a plurality of holes or openings 38, preferably equal in number to the number of holes 32. Each of openings 38 and each of openings 32 communicate with the annular space between bearing 21 and rib 37. Ring 36 is provided with a plurality of radial passages 39, each of which communicates with an opening 38 at one end, the other end of the passage 39 terminating at the inner periphery of ring 36.

Another ring 40 is affixed to the inner peripheral portion of rotating ring 36 and is rotatable therewith. Alternatively, rings 36 and 40 can be made integral, i.e., in one piece. Ring 40 is preferably inclined downward as shown and preferably made in two pieces, one piece 41 being affixed to the top of the inner peripheral portion of ring 36 by screws 42 and the other piece 43 being affixed to the bottom of the inner peripheral portion of ring 36 by screws 44. Ring pieces 41 and 43 are spaced apart as shown to form a hollow or chamber 45 which is cylindrical in configuration and in which are preferably disposed one or more radially spaced annular baffles 46, made for example of perforated flat metal or screens, these baffles being secured by screws 47 or the like to the lower member 43 of ring 40. The inner peripheral portions of members 41, 43 of ring 40 are spaced apart as shown to provide an annular outlet 48, the width of which can be varied so as to insure impingement of the annular converging stream (shown by the broken lines 49) of gaseous cooling medium on the proper portion of the peripheral wall of tubing 12. Although only one annular outlet for the cooling medium is shown, a plurality of such outlets spaced apart in the machine direction can be used, and such outlets can be in the form of a plurality of holes arranged in a ring about the tubing.

Surmounting rotatable ring 36 is a sprocket 50 or the like, which can be rigidly affixed to ring 36 by means of bolts 51 and spacers 52, sprocket 50 being spaced above ring 36. A driver sprocket 53 and an idler sprocket 54 are disposed in diametrically opposed relation with sprocket 50. Driver sprocket 53 rotates about shaft 55, which is rotated in turn by a suitable gear mechanism 56 driven by stationary motor 57 or the like, and idler sprocket 54 rotates about shaft 58 which can be secured to bracket 23 by means of a bracket 59 and nuts 60, 61. A circular roller chain 62 or the like encircles driver sprocket 53, idler sprocket 54 and sprocket 50, the motive force of motor 57 causing the driver sprocket 53 to rotate sprocket 50, and thus rings 36, 41, 43. The idler sprocket 54 takes the sideload off the bearing surfaces, which increases the life of the bearing and its performance as a seal. A suitable chain guard 63 can be provided to enclose the sprocket 50, driver sprocket 53, and idler sprocket 54.

Die 11 is disposed below the lower face of ring 40, the die being provided with an annular orifice 64 and central channel 66 for inflating gas. It is customary to encircle the upper end of the die 11 with a heating element or band 67 to insure control over the temperature of the extruded tube 12.

In operation, thermoplastic material, in the shape of granules or other finely divided form is fed to extruder 10 and heated therein to a molten state. The molten material is then extruded from die 11 through an orifice therein in a continuous manner to form a seamless tubing 12. A gaseous medium, such as air, supplied via line 17, is injected through the axial portion of the die 11 and passes upward therethrough to inflate tubing 12 and cause an increase in the diameter of the tubing as it issues from the die, the inflated tubing 18 forming a "bubble." Upon issuing from die 11, the extruded tubing 12 is cooled in successive sections without contact by the cooling ring 13 of this invention, a gaseous cooling medium such as air being supplied via line 19 from a blower or other source. The cooled, inflated bubble 18 is flattened by guide rolls 14 or the like and collapsed between pinch rolls 15, the inflating gas being trapped between these rolls and die 11. The collapsed tubing 20 is then wound about wind-up reel 16 in a manner well known in the art.

Referring to FIGURE 2, in operation the cooling medium is supplied to pipes 31 in a continuous manner and under sufficient pressure, the gas then passing into the annular plenum 27 provided by ring bracket 23. The gas in plenum 27 passes upwardly through openings 34, 32, into the annular space between bearing 21 and rib 37, and then into the rotating ring 36 via openings 38 and radial passage 39. The gas in passage 39 of rotating ring 36 then passes through the outlets in the inner periphery of ring 36 and into the annular distributing chamber 45 disposed within ring 40, the latter rotating along with ring 36. The cooling gas introduced into distributing chamber 45 strikes baffles 46 and passes through the baffles and then finally issues from the annular outlet 48 as a continuously flowing annular converging stream 49 which is caused to impinge upon the tubing 12 issuing from die 11 and thus cool the tubing.

It is essential in the operation of the improved air ring of my invention that it rotate at a sufficient speed so that the flow of the annular stream of air that impinges upon the extruded tubing is uniform, and for this purpose the air ring should rotate at a speed of at least 10 r.p.m., and can rotate as high as 25 r.p.m., depending upon the diameter of the die and wall thickness of the extruded tubing. By rotating at these speeds about the same center axis as the tubing, the annular air stream will contact the extruded tubing in its formative plastic state about its exterior surface thereof in the form of overlapping annular bands. Such contact will evenly distribute around the peripheral portion of the extruded tubing any portion of the annular air stream which has a velocity significantly lower or greater than that of the average velocity of the annular stream of cooling gas, and thus prevent any uneven cooling of the tubing, which would otherwise cause a variation in the thickness of the tubing, such variations detracting from the strength of the tubing and its appearance. As such, a wound-up roll of the flattened tubing will not have any uneven or humped portions or ridges, due to thickened portions, but rather will have uniform gage.

Although atmospheric air is preferred both as the inflating medium and the cooling medium, it should be understood that any gaseous medium can be used, though most likely atmospheric air will be used because it is cheap and readily available. Such gaseous cooling medium can be cooled to any desired temperature, or in fact may be at room temperature.

The bearing ring 21 provides a dynamic seal, particularly if made of a plastic such as Marlex® olefin polymer, e.g., Marlex 5003 or 6002, the rotating assembly riding on this bearing and held in place thereby both axially and laterally. This bearing ring minimizes air leakage and prolonged use of the apparatus will not develop a clearance between bearing surfaces with wear. The pressure of the air also tends to take some load off the bearing and thereby minimize wear.

The subject invention is not limited in utility to the manufacture of tubing from any particular thermoplastic material. Rather, it can be employed for a variety of thermoplastic materials such as polyethylene, polyvinylchloride, polychlorotrifluoroethylene, nylon, polystyrene, cellulose acetate, cellulose acetate butyrate, ethyl cellulose, and copolymers of 1-olefins, such as copolymers of ethylene butene-1, ethylene and propylene, etc. Such thermoplastic materials can be continuously extruded to form seamless tubing having varying thicknesses, for example between 0.003 and 0.03 inch, or sizes outside of this range.

The materials of construction which can be used in fabricating the improved air ring assembly of this invention and its component parts include those which are not adversely affected by heat radiated from the die, which can be 500° F. or greater, and which will retain their shape under conditions of use. Metals, such as steel, iron, brass, aluminum and the like can be used. Aluminum is generally preferred because of its strength, lightness and ease of fabrication. Though the improved air ring of this invention is in close proximity to the hot die, the circulation of the air through the ring assembly in the manner described above will keep the assembly cool and prevent any adverse effects, such as misalignment due to expansion of metal, or heat deterioration of the plastic heat seal.

Various modifications and alterations of this invention will become apparent to those skilled in the art from the foregoing discussion and accompanying drawing without departing from the scope and spirit of this invention, and it should be understood that this invention is not to be limited unduly to those preferred embodiments set forth herein for illustrative purposes.

I claim:

1. An apparatus for providing a substantially uniform annular converging flow of gas, comprising an annular stationary bearing made of plastic and having a first plurality of openings therein, stationary means to support said bearing, stationary plenum means communicating with said first plurality of openings, means to supply said gas to said plenum means, rotatable annular hollow means positioned on said bearing and defining with said bearing an annular channel communicating with said first plurality of openings, said rotatable hollow annular means having a second plurality of openings communicating with said annular channel, said rotatable hollow annular means also provided with an annular opening adjacent its inner periphery for discharge of said converging flow of gas, and means to rotate said rotatable annular means.

2. An apparatus for preparing blown plastic seamless tubing, comprising means for extruding a molten thermoplastic through an annular orifice in the form of tubing, means to withdraw said tubing from said die, means to inflate said tubing, and means for providing a substantially uniform annular flow of gas converging on the surface of said tubing as it emerges from said die, the latter means comprising an annular stationary bearing made of plastic and having a first plurality of openings therein, stationary means to support said bearing, stationary plenum means communicating with said first plurality of openings, means to supply said gas to said plenum means, rotatable annular hollow means positioned on said bearing and defining with said bearing an annular channel communicating with said first plurality of openings, said rotatable hollow annular means having a second plurality of openings communicating with said annular channel, said rotatable hollow annular means also provided with an annular opening adjacent its inner periphery for discharge of said converging flow of gas, and means to rotate said rotatable annular means.

3. An apparatus for providing a substantially uniform, annular, converging fluid flow, which comprises an annular stationary bearing having an annular truncated V depression in the upper surface and a first plurality of openings therein, bearing support means, plenum means communicating with said first openings, means to supply a fluid to said plenum means, rotatable annular hollow means having adjacent its outer periphery a depending annular truncated V rib resting in said truncated V depression, a second plurality of openings in said rib communicating between said first plurality of openings and said hollow means, an annular opening in said annular hollow means adjacent its inner periphery for discharge of said converging fluid flow, and means to rotate said rotatable annular hollow means.

4. The apparatus of claim 3 wherein the bottom of said truncated V rib is larger than and spaced above the bottom of said truncated V depression to provide an annular space therebetween.

5. The apparatus of claim 3 wherein last said means rotates said rotatable annular hollow means at a speed of from 10 to 25 r.p.m.

6. The apparatus of claim 3 wherein said annular stationary bearing is made of a high density, self-lubricating plastic.

References Cited by the Examiner

UNITED STATES PATENTS

| | | | |
|---|---|---|---|
| 2,632,206 | 3/53 | Pierce | 18—14 |
| 2,770,009 | 11/56 | Rogal et al. | 18—14 |
| 2,947,031 | 8/60 | HoChow et al. | 18—14 |

MICHAEL V. BRINDISI, *Examiner.*

WILLIAM J. STEPHENSON, *Primary Examiner.*